---
3,431,476
SYSTEM WITH A MOTOR CONTROLLED SYNCHRONOUS INVERTER
James B. Wright, Huntsville, Ala., assignor to the United States of America as represented by the Secretary of the Army
Filed Feb. 23, 1966, Ser. No. 531,329
U.S. Cl. 318—18                                                3 Claims
Int. Cl. G05b *11/06, 13/02*

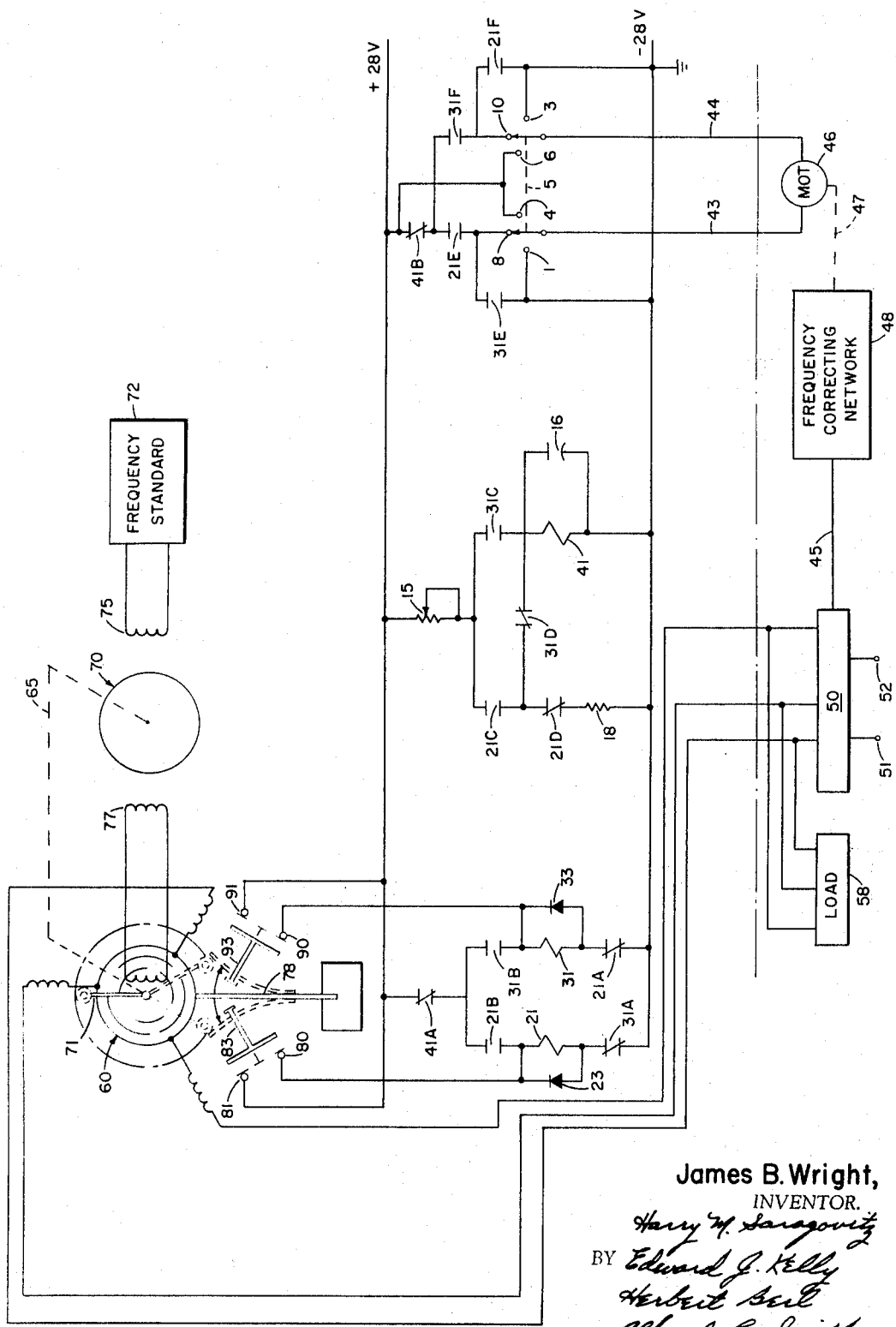

---

ABSTRACT OF THE DISCLOSURE

A frequency control system which is responsive to a frequency deviation from a set standard frequency and including a synchro error detector for sensing the frequency deviation which actuates an "on-off" servo motor control means for correcting the offset frequency algebraically until it is back to the set standard frequency.

---

The invention accomplishes its purpose by using a synchro control transformer, or resolver, to resolve the three phase voltage output of an inverter to a single phase and to permit the adding or subtracting of frequency increments by physically rotating the rotor of the resolver. The output of the rotor is fed into one field coil of a servo motor, and another field coil of the servo motor is excited from an appropriate crystal controlled standard frequency source. The rotor of the servo motor is mechanically geared back to the rotor of the resolver. This system does not require a high gain (tight) servo lock. Actually, it is desirable to have considerable slack in the system so that small frequency transients will be integrated out.

If the frequency output of the resolver is different from that of the standard frequency, a phase difference will begin accumulating. When this phase difference becomes great enough to develop sufficient torque for the motor to begin rotating, the motor will drive the rotor of the resolver in the proper direction and at such a rate as to algebraically add or subtract the proper frequency increment to the output of the resolver.

The frequency output of the resolver then becomes the input frequency of the resolver plus or minus the revolutions per second of the rotor of the resolver which will then equal the standard frequency and at a phase angle that is somewhere between 0 and 90°. This phase angle is a function of the torque output required from the motor.

If the frequency of the inverter is above the standard frequency the motor will rotate in one direction and if the frequency of the inverter is below the standard frequency the motor will rotate in the opposite direction. The rate of rotation is a direct function of the frequency difference.

It is, therefore, an object of this invention to provide a fast acting frequency control system for an inverter with a three phase output converted from a direct current input.

Another object of this invention is to provide a novel circuit control system automatically responsive to D.C. potentials for controlling the frequency of an alternating voltage at a set standard frequency.

Other objects and many of the attendant advantages of this invention will be readily appreciated as the same becomes better understood by reference to the following detailed description when considered in conjunction with the accompanying drawing in which the single figure illustrates diagrammatically the improved frequency control system for an inverter.

Referring now to the figure, the three phase output from inverter 50 is applied to system load 58 and to resolver 60 where the three phases are resolved into a single phase output. The single phase output of resolver 60 is fed to field coil 77 of servo motor 70. A crystal controlled standard frequency source 72 is applied to field coil 75 of servo motor 70. If the frequency output of resolver 60 applied to field coil 77 is different from the standard frequency on field coil 75 a phase difference will begin to accumulate. When this phase difference becomes great enough to develop sufficient torque, the rotor of resolver 60 will begin rotating at a speed which is the same as the difference between the two frequencies. The rotor of servo motor 70 is mechanically connected back to the rotor of resolver 60 by mechanical connection 65. The rotor of resolver 60 is then driven in the proper direction and at such a rate to algebraically add the proper frequency increment to the output of resolver 60. The frequency output of resolver 60 then becomes its input frequency plus or minus the revolutions per second of the rotor of resolver 60 which will then equal the standard frequency impressed on field coil 75 of servo motor 70. The output of resolver 60 will be at a phase angle that is somewhere between 0 and 90°.

Indicator arm 71, connected to resolver 60 rotor, will rotate either forward or backward depending on whether the frequency of resolver 60 is above or below the standard frequency. Actuator arm 78 is positioned where indicator arm 71 will strike it on every revolution that the indicator arm passes. Actuator arm 78, when struck by indicator arm 71, will close either switch 83 on terminals 80 and 81 or switch 93 on terminals 90 and 91 depending on whether indicator arm 71 is rotating clockwise or counterclockwise.

In the operation of the inverter frequency control system, say the frequency of resolver 60 is below that of frequency standard 72 causing indicator arm 71 to rotate clockwise striking actuator arm 78 which in turn closes switch 83 on contacts 80 and 81. With contacts 80 and 81 closed on each other, a positive voltage source is connected on one side of relay coil 21 and a negative voltage source already exists on the other side of relay coil 21. All relay contacts shown in the drawing are in the de-activated state.

Relay coil 21 actuates relay contacts 21A through 21F, completing a holding circuit, with the following results. Contact 21A opens, thus, isolating relay coil 31 and avoiding any action by relay contacts 31A through 31F. Contact 21B closes, completing the circuit from a positive voltage source across relay coil 21, to a negative voltage source. Contact 21C closes and contact 21D opens, thus, a positive voltage source is connected on one side of relay coil 41 through variable resistor 15. Capacitor 16, connected across relay coil 41, and variable resistor 15 determine the time constant for energizing relay coil 41. Resistor 18 is a fast discharge path for capacitor 16 after relay coil 41 is actuated. Relay coil 41 actuates relay contacts 41A and 41B and both open, thus, causing drop out of relay coil 21 and subsequent removal of voltage sources from D.C. motor 46. Diode 23 is placed in parallel with relay coil 21 to suppress voltage spikes, on drop out of relay coil 21, that could harm the relay contacts. In the design of the inverter frequency control system a time constant of 1 second delay time for relay coil 41 causes a 0.01 cycle per second correction in the inverter frequency. When desirable, variable resistor 15 can be set at a lower value and the delay time for energization of relay coil 41 can be reduced and frequency correction increment limits will be reduced accordingly. Contacts 21E and 21F both close and this applies a positive voltage source on conductor lead 43 side of D.C. motor 46 and a negative voltage source on conductor lead 44 side of D.C. motor 46.

Output shaft 47 of D.C. motor 46 is directly connected to frequency correcting network 48. Frequency correcting network 48 comprises two parallel resonant circuits, one resonant at a set frequency below the standard frequency and other resonant at a set frequency above the standard frequency. Output shaft 47 of D.C. motor 46 drives a wiper arm across a potentiometer that varies resistance in each of the two resonant circuits. The set resonant frequencies are different from the standard frequency in the same amount such that when the potentiometer divides the current through their circuits equally, the inverter is held at the standard frequency. Any difference in current outputs of the two resonant circuits are amplified and applied to the shunt field of inverter compound D.C. motor (not shown) in inverter 50 by connector 45. The difference in current outputs will be less in the output of frequency correcting network 48 if the frequency of the inverter is below the standard frequency since the current will be conducting at fewer cycles per second. The less current applied to the shunt field of compound D.C. motor causes a faster speed of rotation and thus a correcting rise in output frequency of the inverter. The opposite will be true if the frequency of the inverter is above the standard frequency. Power to run inverter compound D.C. motor 50 is supplied at terminals 51 and 52.

If the reverse were true and the frequency of resolver 60 is above frequency standard 72, indicator arm 71 will then rotate counterclockwise striking actuator arm 78 which in turn closes switch 93 on contacts 90 and 91. With contacts 90 and 91 closed on each other a positive voltage source is connected on one side of relay coil 31 and a negative voltage source already exists on the other side of relay coil 31. Relay coil 31 actuates relay contacts 31A through 31F. Results are that the polarities of the applied voltages to D.C. motor 46 are opposite from what they were with relay coil 21 actuated, i.e., conductor lead 44 is now the positive voltage source and conductor lead 43 is now the negative voltage source. The current difference will be greater in the output of frequency correcting network 48 with the frequency of the inverter above the standard frequency. Diode 33 is placed in parallel with relay coil 31 to suppress voltage spikes, on drop out of relay coil 31, that could harm the relay contacts. Frequency correction can be made manually by double-pole double-throw switch 5 that closes either on terminals 3 and 4 or on terminals 6 and 1 and connects both positive and negative voltage sources directly to D.C. motor 46.

While many changes in constructional details and features may become apparent to those skilled in the art, in view of the illustrated preferred form shown and described herein, I desire to be limited only by the scope and spirit of the appended claims.

I claim:
1. An inverter frequency control system comprising an inverter having a three phase output; a resolver having a three phase stator primary and a single phase rotor secondary for converting said three phase output from said inverter to a single phase output; a servo motor frequency comparing means having two field coils, one of said field coils connected to said single phase output from said resolver, a second field coil connected to a standard frequency source, a rotor of said servo motor mechanically locked with the rotor of said resolver whereby torque is developed on said servo motor rotor if the frequency of said resolver is different from said standard frequency, with said resolver rotor totaling either clockwise or counterclockwise resulting in either algebraically adding to or subtracting from the frequency of said resolver the sum of which equals said standard frequency; a voltage supply source having positive and negative terminals; switching means for switching said voltage supply source; a polarity selecting means for switching of said voltage supply source according to the direction of rotation of said servo motor rotor; a D.C. motor responsive to said positive and negative voltage sources; a timing circuit for automatically open circuiting said voltage sources from said D.C. motor after a preset time interval; a frequency correcting network responsive to D.C. motor output and further connected to said inverter and having means for varying shunt field current of inverter D.C. motor causing the speed of said inverter D.C. motor to vary with subsequent output frequency variance.

2. An inverter frequency control system as set forth in claim 1, wherein said polarity selecting means comprises two switches; an indicator arm; said arm positioned normally from said resolver rotor; an actuator arm; said actuator arm positioned such that upon each revolution said indicator arm attached to said resolver rotor will strike said actuator arm, with said actuator arm further closing one of switches; one of said switches representing one polarity and a second of said switches representing the other polarity, with polarities, thus, determined by the direction of rotation of said resolver rotor; two relay coils; one of said relay coils being actuated upon closing of said switch; a plurality of relay contacts; said relay contacts being switched upon actuation of said relay coil and further connecting said voltage supply source to said D.C. motor.

3. An inverter frequency control system as set forth in claim 2, wherein said timing circuit means comprises a series connection of a capacitor and a variable resistor; a relay coil; said relay coil connected in parallel with said capacitor; a plurality of relay contacts; said relay contacts being switched upon actuation of said relay coil and further removing said voltage supply source from said D.C. motor.

References Cited
UNITED STATES PATENTS

| | | |
|---|---|---|
| 2,446,607 | 8/1948 | Peterson. |
| 2,482,804 | 9/1949 | Sorensen. |
| 2,503,105 | 4/1950 | Freas. |
| 2,564,439 | 8/1951 | Marrison. |
| 2,701,329 | 2/1955 | Lynch et al. |
| 3,105,189 | 9/1963 | Forster. |

ORIS L. RADER, *Primary Examiner.*

THOMAS E. LYNCH, *Assistant Examiner.*

U.S. Cl. X.R.

318—30